(12) United States Patent
Bilger et al.

(10) Patent No.: US 9,584,180 B1
(45) Date of Patent: Feb. 28, 2017

(54) NETWORKING SYSTEM AND METHOD

(71) Applicants: Aaron Bilger, Alpharetta, GA (US);
Kyle Leron Howell, Atlanta, GA (US);
David Lawrence Spiller, Cumming, GA (US); Thomas P. Tooley, Alpharetta, GA (US); John Wade, Alpharetta, GA (US)

(72) Inventors: Aaron Bilger, Alpharetta, GA (US);
Kyle Leron Howell, Atlanta, GA (US);
David Lawrence Spiller, Cumming, GA (US); Thomas P. Tooley, Alpharetta, GA (US); John Wade, Alpharetta, GA (US)

( * ) Notice: Subject to any disclaimer, the term of this patent is extended or adjusted under 35 U.S.C. 154(b) by 630 days.

(21) Appl. No.: 14/021,394

(22) Filed: Sep. 9, 2013

Related U.S. Application Data

(60) Provisional application No. 61/700,597, filed on Sep. 13, 2012.

(51) Int. Cl.
*G01R 31/08* (2006.01)
*H04B 3/02* (2006.01)

(52) U.S. Cl.
CPC ...................................... *H04B 3/02* (2013.01)

(58) Field of Classification Search
None
See application file for complete search history.

(56) References Cited

U.S. PATENT DOCUMENTS

| | | | |
|---|---|---|---|
| 6,442,448 B1 | 8/2002 | Finley et al. | |
| 2006/0125422 A1* | 6/2006 | Costa | H02J 3/14 315/294 |
| 2008/0100436 A1* | 5/2008 | Banting | H02J 13/0075 340/539.22 |
| 2009/0124209 A1* | 5/2009 | Keselman | H04B 3/54 455/67.13 |
| 2010/0130210 A1* | 5/2010 | Tokgoz | H04W 36/0083 455/437 |
| 2013/0207454 A1* | 8/2013 | Stellick | H04L 12/10 307/1 |

\* cited by examiner

*Primary Examiner* — Duc C Ho
(74) *Attorney, Agent, or Firm* — Douglas J Visnius

(57) ABSTRACT

A system may include an interface connected to at least one of a plurality of nodes via non-power line wiring not used for Ethernet communications. The system may also include a controller carrying the interface, and the controller uses a broadband over power line protocol to provide Ethernet data communications over the non-power line wiring amongst each of the plurality of nodes.

6 Claims, 15 Drawing Sheets

NETWORKING SYSTEM AND METHOD

CROSS-REFERENCE TO RELATED APPLICATIONS

This application claims the benefit of U.S. Provisional Application No. 61/700,597, filed 13 Sep. 2012. The present application and the application identified above include identical inventorship and ownership.

BACKGROUND

The disclosure relates to the field of computer systems, and, more particularly, to computer networking systems.

Generally, data carried on a conductor that can also carry AC electric power may be referred to as broadband over powerline (BPL), mains communication, powerline communication, smart grids, and/or the like. The standards for such include Institute of Electrical and Electronics Engineers (IEEE) 1901, G.hn, and/or the like.

Ethernet communications includes standards such as IEEE 802.3, IEEE 802.11, and/or the like. The Internet Protocol suite may include applicable standards for the application layer, the transport layer, the Internet layer, the link layer, and/or the like.

SUMMARY

In one embodiment, a system may include an interface connected to at least one of a plurality of nodes via non-power line wiring not used for Ethernet communications. The system may also include a controller carrying the interface, and the controller uses a broadband over power line protocol to provide Ethernet data communications over the non-power line wiring amongst each of the plurality of nodes.

The controller may further provide bridging amongst any of the plurality of nodes. The controller may additionally utilize Internet Protocol amongst any of the plurality of nodes.

The controller may also comprise an Ethernet switch. The broadband over power line protocol may comprise IEEE 1901.

The plurality of nodes may comprise elevator network components. The controller may determine signal strength on the non-power line wiring.

The controller may further include an indicator to display the signal strength on the non-power line wiring to a user. The controller may additionally adjust data rates on the non-power line wiring based upon the signal strength determination.

The controller may also provide input power that is agnostic as to its polarity. The interface may further comprise a wireless and/or wired connection.

Another aspect is a method, which may include connecting to at least one of a plurality of nodes via non-power line wiring not used for Ethernet communications. The method may also include using a broadband over power line protocol via a controller to provide Ethernet data communications over the non-power line wiring amongst each of the plurality of nodes.

The method may further include bridging amongst any of the plurality of nodes via the controller. The method may additionally include using Internet Protocol amongst any of the plurality of nodes via the controller.

The method may also include where some of the plurality of nodes comprise elevator network components. The method may further include determining signal strength on the non-power line wiring via the controller.

The method may additionally include using an indicator to display the signal strength on the non-power line wiring to a user. The method may also include adjusting data rates on the non-power line wiring based upon the signal strength determination.

The method may further include providing input power that is agnostic as to its polarity via the controller. The method may additionally include providing a wireless and/or wired connection via the controller.

Another aspect is computer readable program codes coupled to tangible media. The computer readable program codes may be configured to cause the program to connect to at least one of a plurality of nodes via non-power line wiring not used for Ethernet communications. The computer readable program codes may also use a broadband over power line protocol via a controller to provide Ethernet data communications over the non-power line wiring amongst each of the plurality of nodes.

The computer readable program codes may further bridge amongst any of the plurality of nodes via the controller. The computer readable program codes may additionally use Internet Protocol amongst any of the plurality of nodes via the controller.

The computer readable program codes may also determine signal strength on the non-power line wiring via the controller. The computer readable program codes may further use an indicator to display the signal strength on the non-power line wiring to a user.

The computer readable program codes may additionally adjust data rates on the non-power line wiring based upon the signal strength determination. The computer readable program codes may also provide input power that is agnostic as to its polarity via the controller. The computer readable program codes may further provide at least one of a wireless and wired connection via the controller.

DETAILED DESCRIPTION

Embodiments will now be described more fully hereinafter with reference to the accompanying drawings, in which preferred embodiments are shown. Like numbers refer to like elements throughout.

Figure 1:
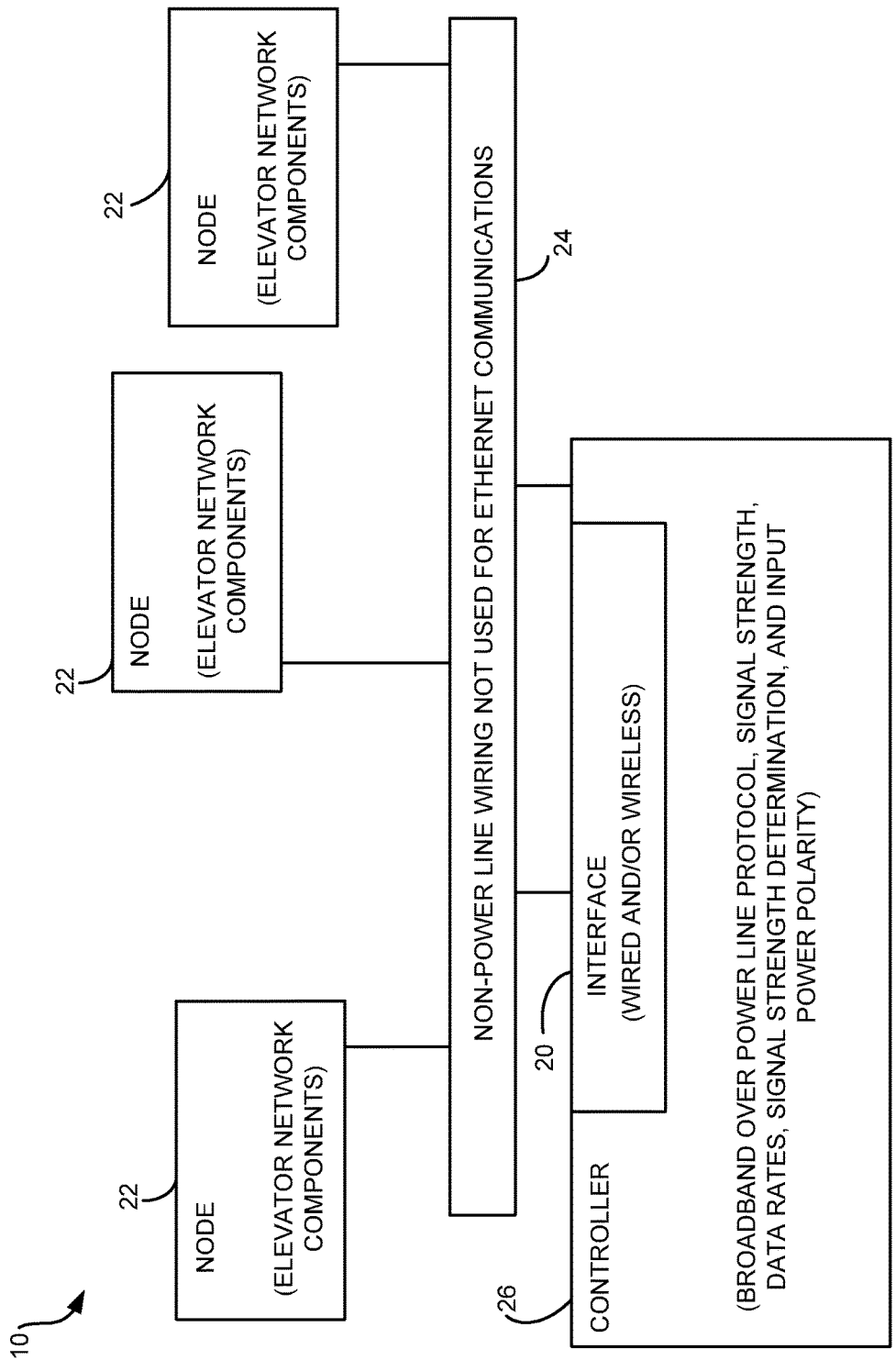
FIG. 1 is a block diagram illustrating a networking system in accordance with various embodiments.

With reference now to FIG. 1, a communication system 10 is initially described. In one embodiment, the system 10 includes an interface 20 connected to at least one of a plurality of nodes 22 via non-power line wiring 24 not used for Ethernet communications. The system may also include a controller 26 carrying the interface 20, and the controller uses a BPL protocol to provide Ethernet data communications over the non-power line wiring 24 amongst each of the plurality of nodes. For example, the non-power line wiring 24 not used for Ethernet communications is enabled by the controller 26 to provide Ethernet data communications over the non-power line wiring 24 amongst each of the plurality of nodes.

In one embodiment, the controller 26 further provides bridging amongst any of the plurality of nodes 22. In another embodiment, the controller 26 additionally utilizes the Internet Protocol suite amongst any of the plurality of nodes. In another embodiment, the controller 26 additionally utilizes the Internet Protocol amongst any of the plurality of nodes.

In one embodiment, the controller 26 comprises an Ethernet switch. In another embodiment, the controller 26 comprises Powerline Communication Chipset 14, e.g. HomePlug and/or the like, Microcontroller 15, Flash Memory 16, and/or the like. In another embodiment, the BPL protocol comprises IEEE 1901 and/or G.hn.

In one embodiment, the plurality of nodes 22 comprises elevator network components. In another embodiment, the controller 26 determines signal strength on the non-power line wiring 24.

In one embodiment, the controller 26 further includes an indicator 13 to display the signal strength on the non-power line wiring 24 to a user (not shown). In another embodiment, the controller 26 additionally adjusts data rates on the non-power line wiring 24 based upon the signal strength determination.

In one embodiment, the controller 26 also provides input power that is agnostic as to its polarity. In another embodiment, the interface 20 further comprises a wireless and/or wired connection, e.g. IEEE 802.3, IEEE 802.11, and/or the like.

Figure 2:
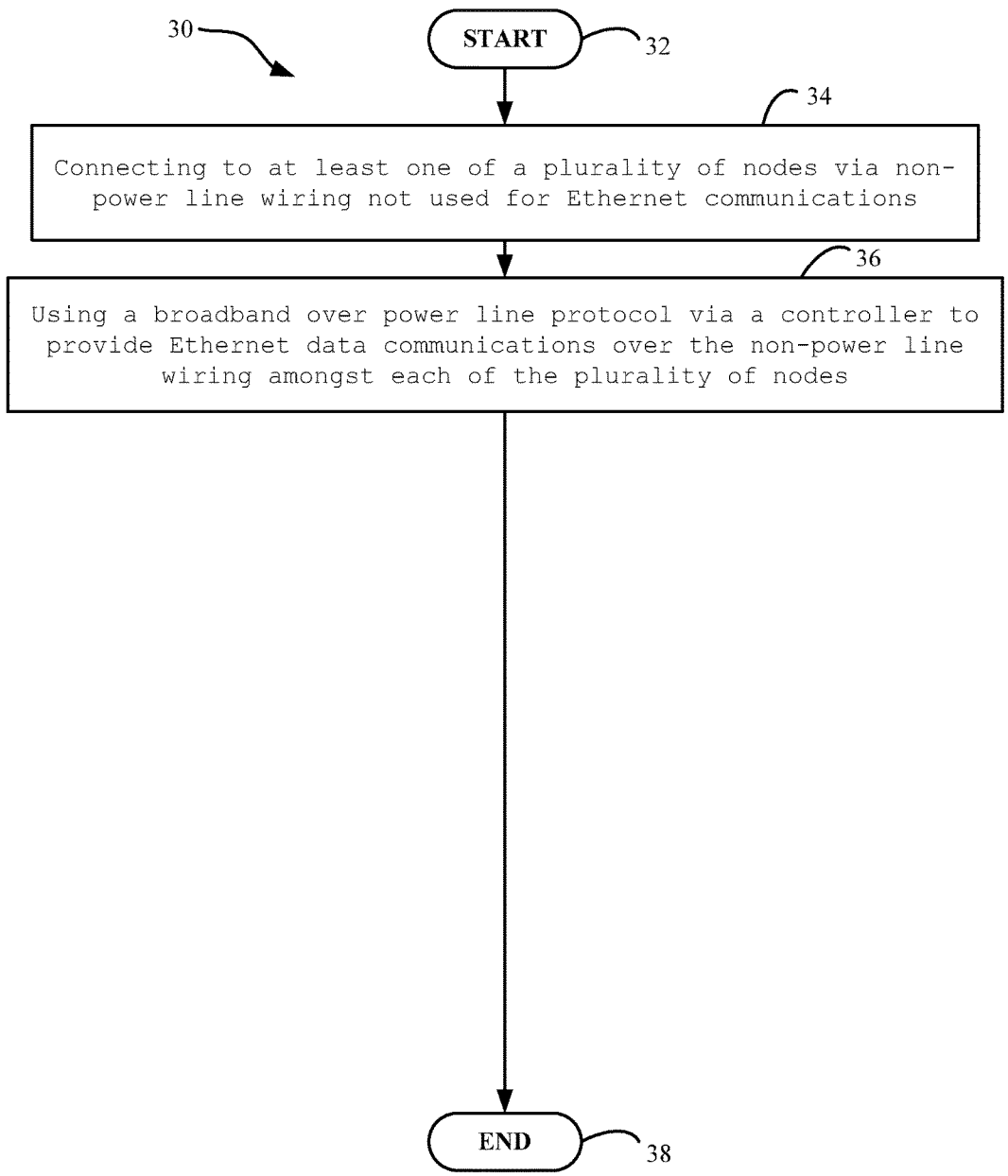
FIG. 2 is a flowchart illustrating method aspects according to various embodiments.

Another aspect is a method, which is now described with reference to flowchart 30 of FIG. 2. The method begins at Block 32 and may include connecting to at least one of a plurality of nodes via non-power line wiring not used for Ethernet communications at Block 34. The method may also include using a broadband over power line protocol via a controller to provide Ethernet data communications over the non-power line wiring amongst each of the plurality of nodes at Block 36. The method ends at Block 38.

Figure 3:
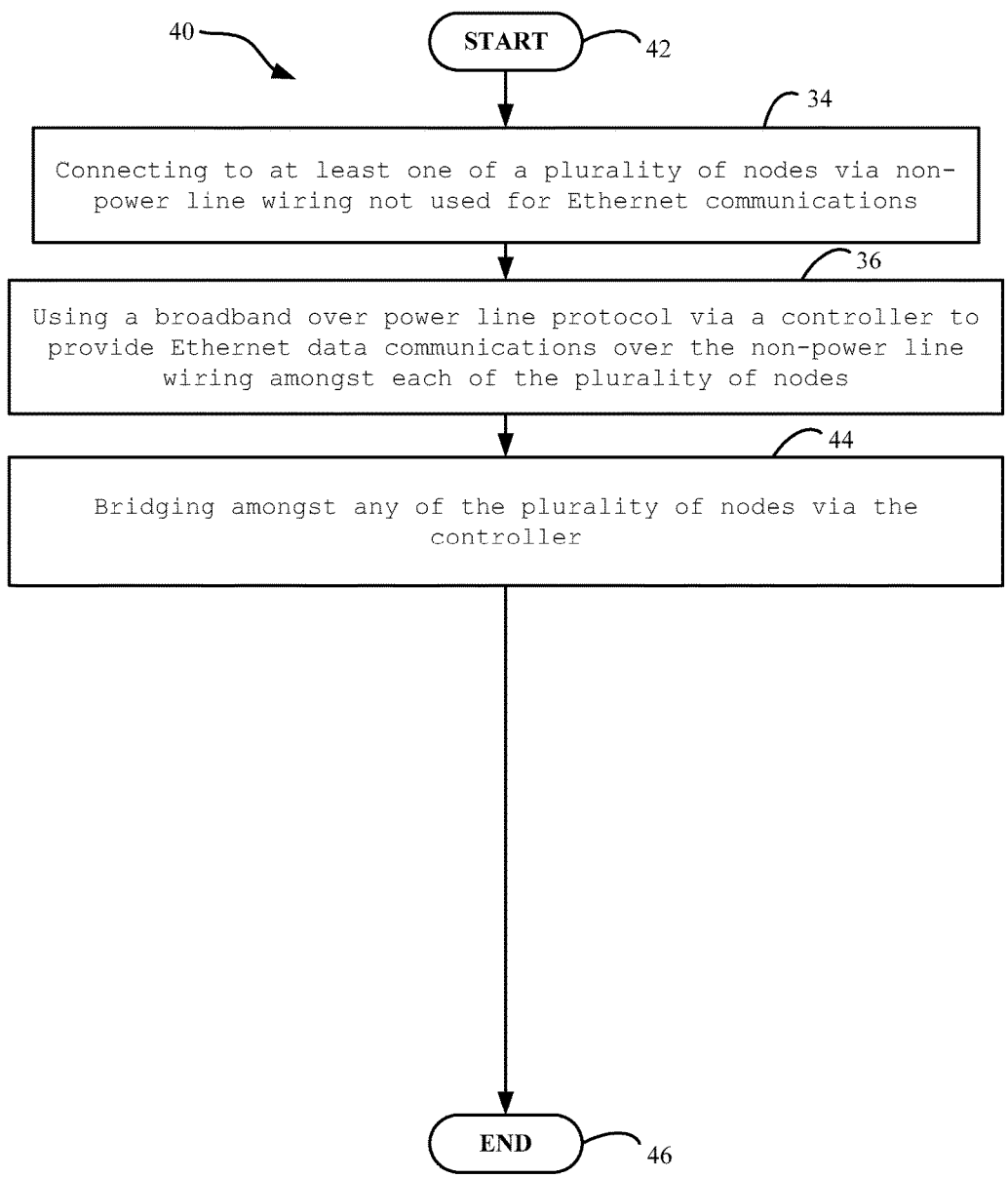
FIG. 3 is a flowchart illustrating method aspects according to the method of FIG. 2.

In another method embodiment, which is now described with reference to flowchart 40 of FIG. 3, the method begins at Block 42. The method may include the steps of FIG. 2 at Blocks 34 and 36. The method may additionally include bridging amongst any of the plurality of nodes via the controller at Block 44. The method ends at Block 46.

Figure 4:
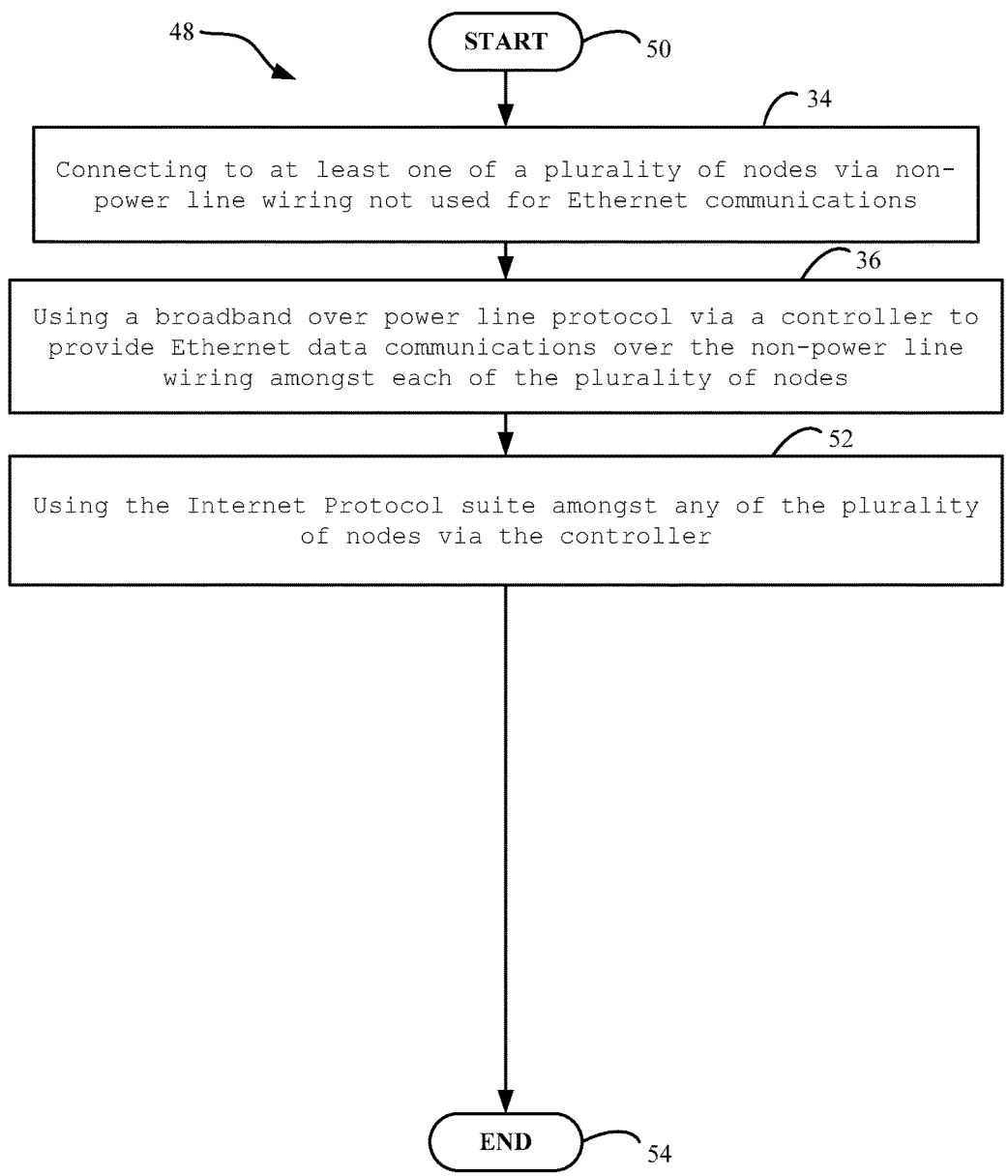
FIG. 4 is a flowchart illustrating method aspects according to the method of FIG. 2.

In another method embodiment, which is now described with reference to flowchart 48 of FIG. 4, the method begins at Block 50. The method may include the steps of FIG. 2 at Blocks 34 and 36. The method may additionally include using the Internet Protocol suite amongst any of the plurality of nodes via the controller at Block 52. The method ends at Block 54.

Figure 5:
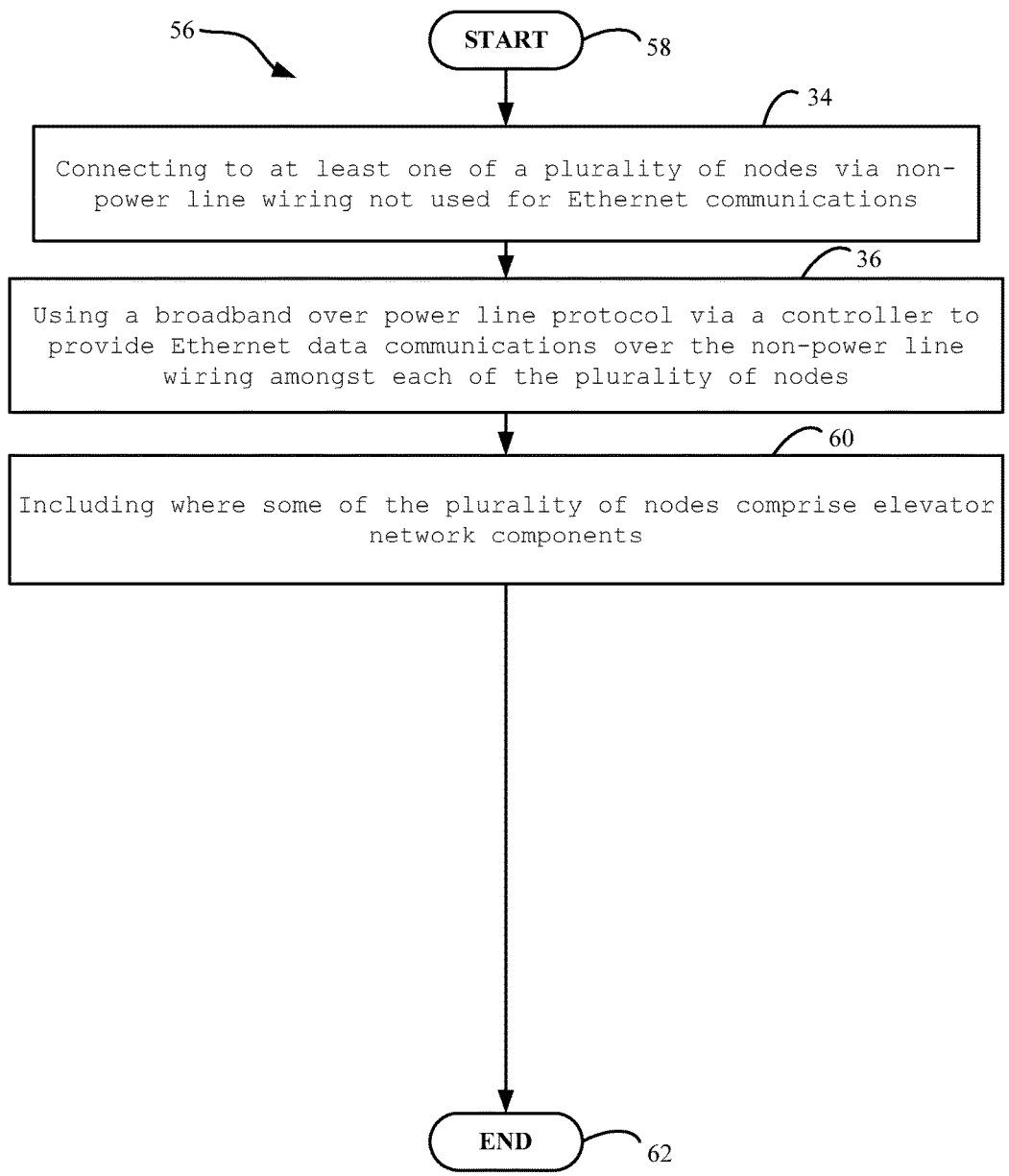
FIG. 5 is a flowchart illustrating method aspects according to the method of FIG. 2.

In another method embodiment, which is now described with reference to flowchart 56 of FIG. 5, the method begins at Block 58. The method may include the steps of FIG. 2 at Blocks 34 and 36. The method may additionally include where some of the plurality of nodes comprise elevator network components at Block 60. The method ends at Block 62.

Figure 6:
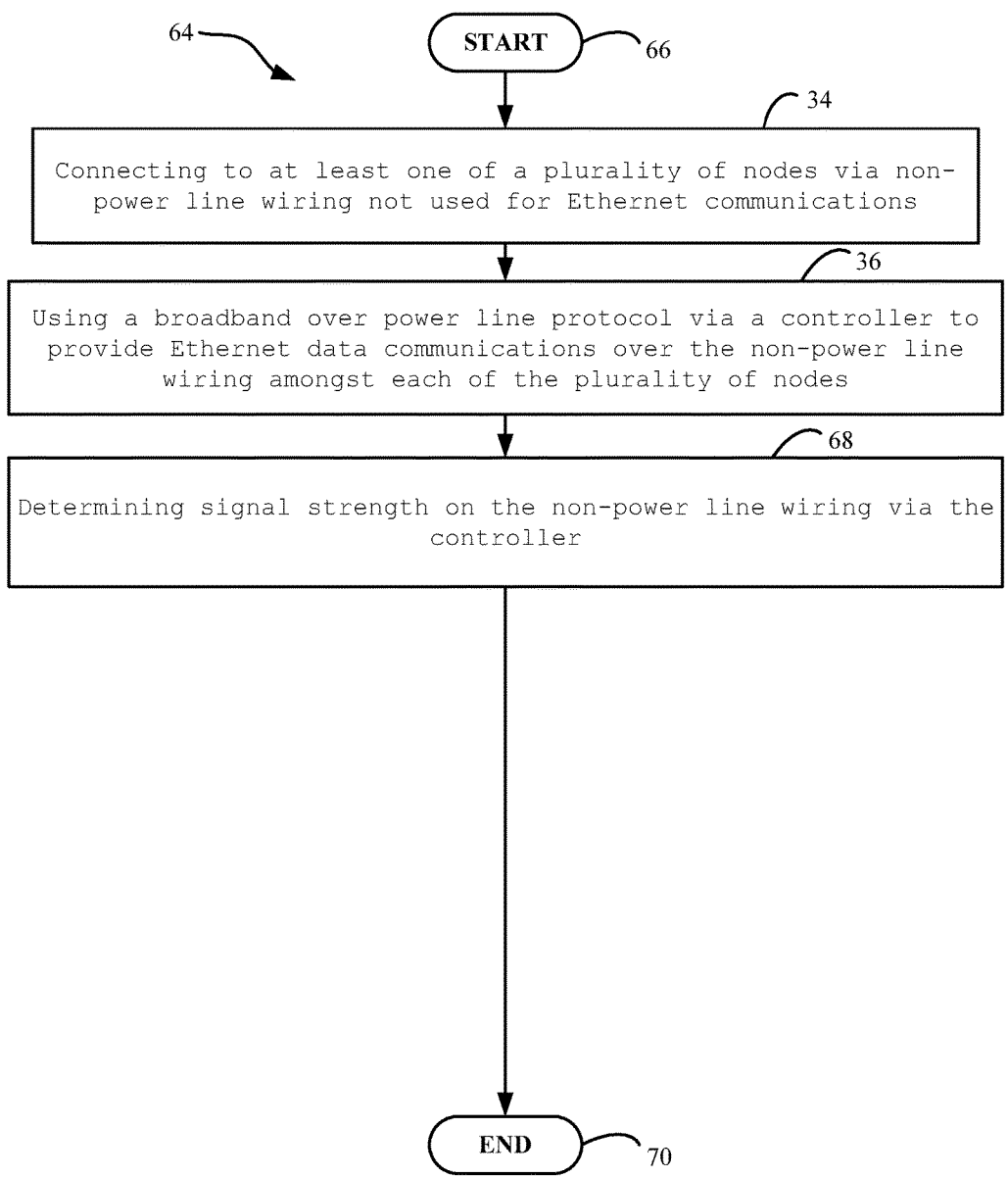
FIG. 6 is a flowchart illustrating method aspects according to the method of FIG. 2.

In another method embodiment, which is now described with reference to flowchart 64 of FIG. 6, the method begins at Block 66. The method may include the steps of FIG. 2 at Blocks 34 and 36. The method may additionally include determining signal strength on the non-power line wiring via the controller at Block 68. The method ends at Block 70.

Figure 7:
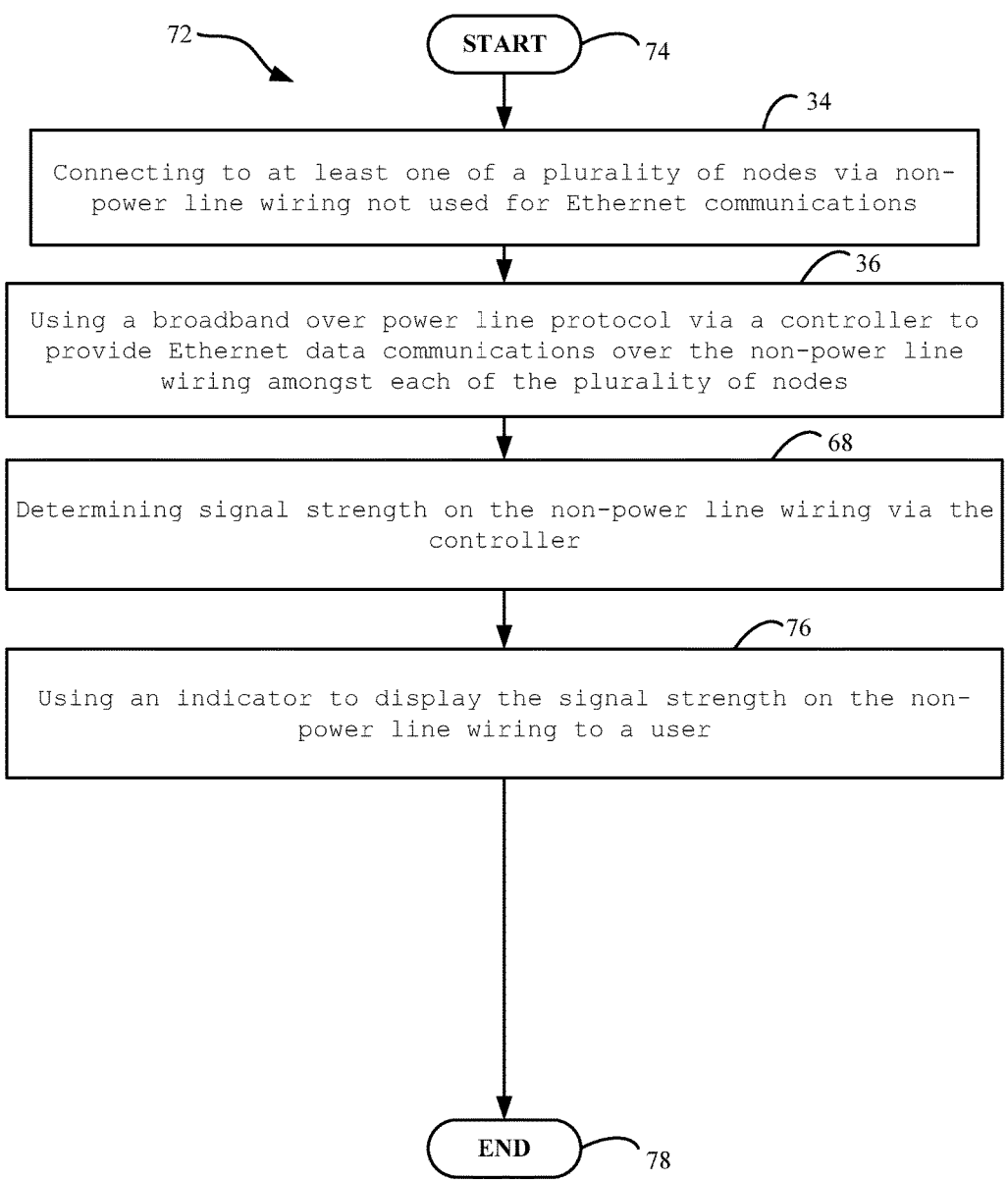
FIG. 7 is a flowchart illustrating method aspects according to the method of FIG. 6.

In another method embodiment, which is now described with reference to flowchart 72 of FIG. 7, the method begins at Block 74. The method may include the steps of FIG. 6 at Blocks 34, 36, and 68. The method may additionally include using an indicator to display the signal strength on the non-power line wiring to a user at Block 76. The method ends at Block 78.

Figure 8:
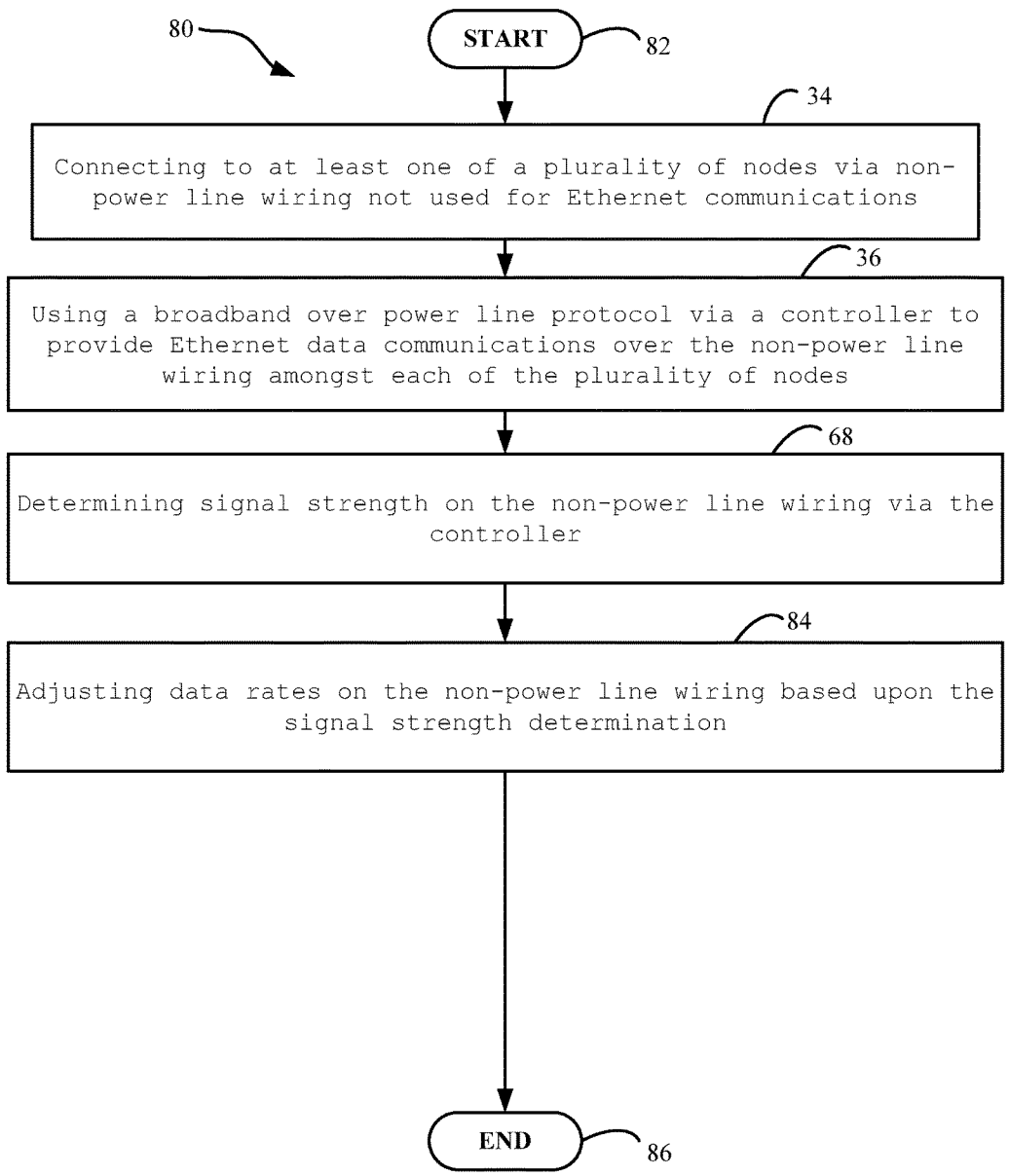
FIG. 8 is a flowchart illustrating method aspects according to the method of FIG. 6.

In another method embodiment, which is now described with reference to flowchart 80 of FIG. 8, the method begins at Block 82. The method may include the steps of FIG. 6 at Blocks 34, 36, and 68. The method may additionally include adjusting data rates on the non-power line wiring based upon the signal strength determination at Block 84. The method ends at Block 86.

Figure 9:
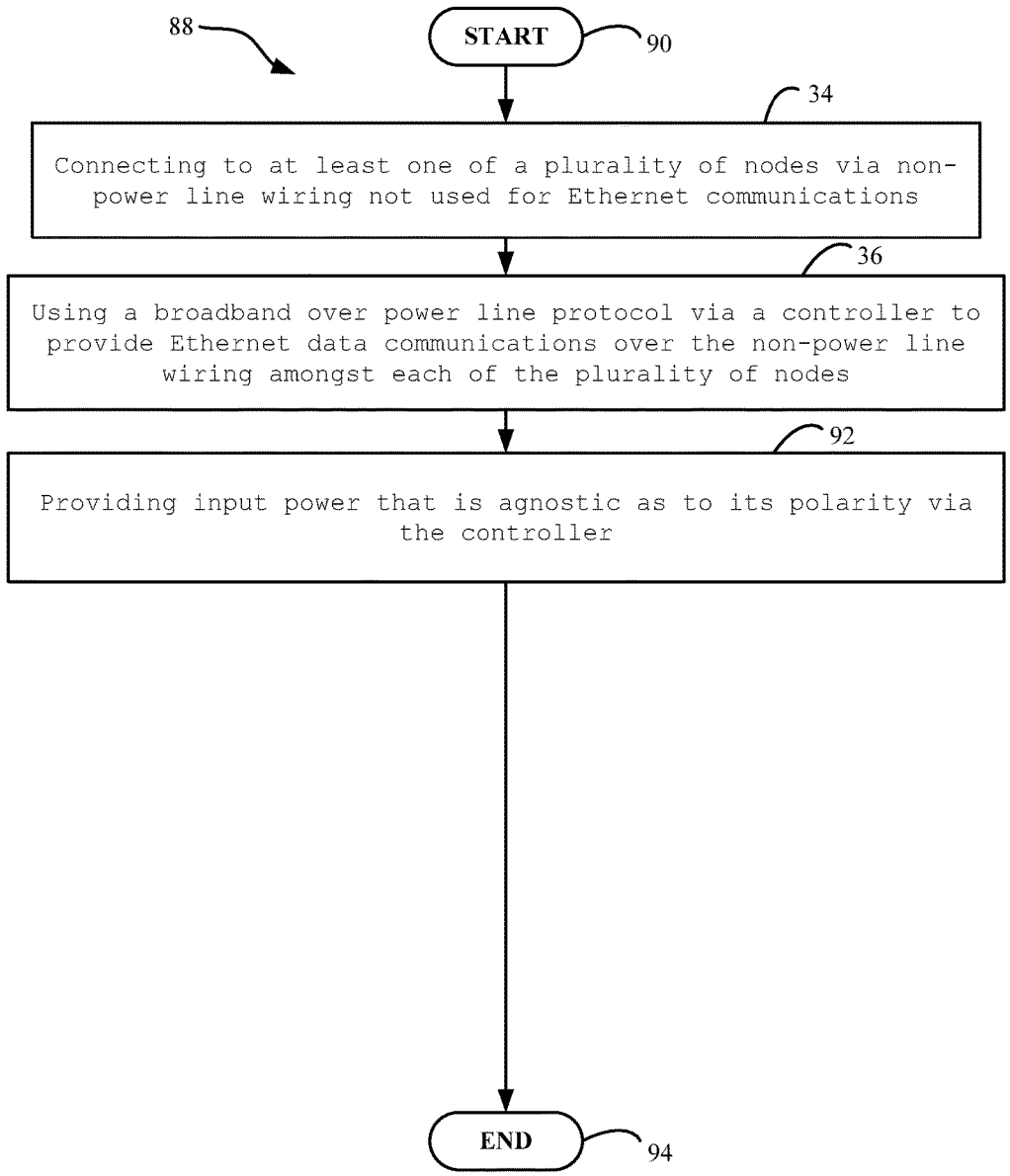
FIG. 9 is a flowchart illustrating method aspects according to the method of FIG. 2.

In another method embodiment, which is now described with reference to flowchart 88 of FIG. 9, the method begins at Block 90. The method may include the steps of FIG. 2 at Blocks 34 and 36. The method may additionally include providing input power that is agnostic as to its polarity via the controller at Block 92. The method ends at Block 94.

Figure 10:
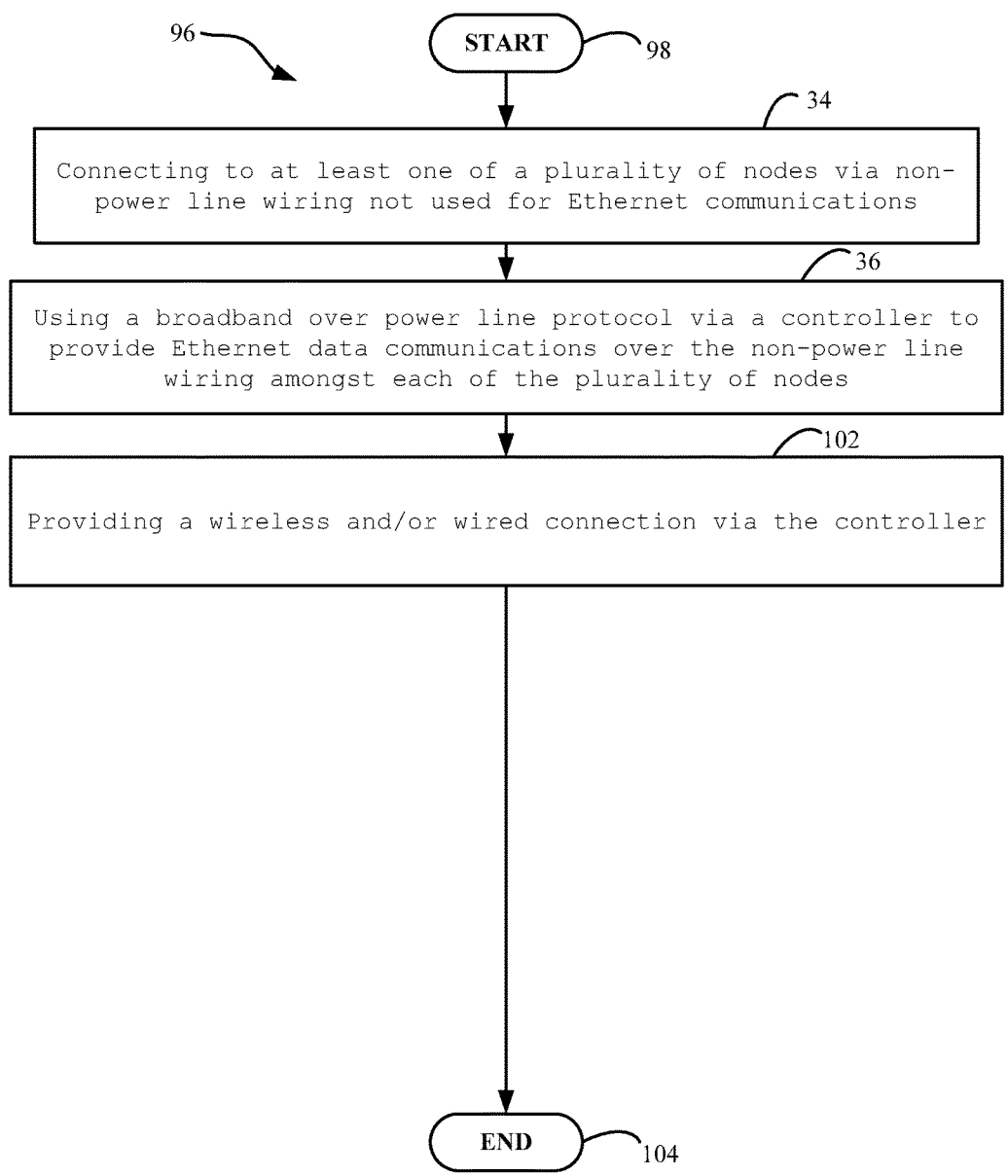
FIG. 10 is a flowchart illustrating method aspects according to the method of FIG. 2.

In another method embodiment, which is now described with reference to flowchart 96 of FIG. 10, the method begins at Block 98. The method may include the steps of FIG. 2 at Blocks 34 and 36. The method may additionally include providing a wireless and/or wired connection via the controller at Block 102. The method ends at Block 104.

Another aspect is computer readable program codes coupled to tangible media for a networking system 10. The computer readable program codes may be configured to cause the program to connect to at least one of a plurality of nodes 22 via non-power line wiring 24 not used for Ethernet communications. The computer readable program codes may also use a broadband over power line protocol via a controller 26 to provide Ethernet data communications over the non-power line wiring 24 amongst each of the plurality of nodes 22.

The computer readable program codes may further bridge amongst any of the plurality of nodes 22 via the controller 26. The computer readable program codes may additionally use the Internet Protocol suite amongst any of the plurality of nodes 22 via the controller 26.

The computer readable program codes may also determine signal strength on the non-power line wiring 24 via the controller 26. The computer readable program codes may further use an indicator 13 to display the signal strength on the non-power line wiring 24 to a user.

The computer readable program codes may additionally adjust data rates on the non-power line wiring 24 based upon the signal strength determination. The computer readable program codes may also provide input power that is agnostic as to its polarity via the controller 26. The computer readable program codes may further provide at least one of a wireless and wired connection via the controller 26.

In one embodiment, system 10 adapts HomePlug Powerline communication to run 802.3 Technology over wiring 24 which is neither structured nor intended for the purpose of communication. Powerline communication is intended for Ethernet communication over power wires in a residential structure, for example. In another embodiment, system 10 adapts that technology to wiring found in the operation of elevators.

In one embodiment, system 10 does not use power wiring as the medium, but instead uses existing wiring found between the engineering room to each of the floors, as well as the wiring to each of the cars in an elevator system, e.g. elevator network components. As a result, system 10 enables high speed communication between each of these devices enabling a higher data communication medium which can provide better system controls, audio, video, destination dispatch, and/or the like.

Many methods exist which provide for communication over wiring which is not structured, including RS-485, X10, RS-232, HomePlug, Home Phone Networking Alliance (HPNA), and DSL. Only the last three currently provide 802.3 compatible Ethernet communication. Where HomePlug and HPNA allow for any topology (tree, star or combination), DSL currently cannot offer this feature.

DSL may require a device on each end in order to communicate over this medium. HPNA cannot support the data rates or the signal strength offered by the system 10.

In one embodiment, the system 10 provides a method where existing wire 24 can be used as the medium for 802.3 and/or 802.11 Ethernet and TCP/IP traffic. This is provided in a largely cable technology- and topology-agnostic fashion, accommodating cable twisted or not, tree or not, star or not and any combination thereof. In another embodiment, as a result of the foregoing, the system 10 saves the cost of upgrading data communication between the different components of an elevator, e.g. elevator network components. In another method embodiment, the system 10 comprises a network switch for bridging to standard 802.3 (CAT5/CAT6) Ethernet communications networks.

In one embodiment, the system 10 provides a method and a visual indicator 13 to the user for signal strength down said wire 24. In another embodiment, system 10 has within its confines the ability to download software updates via this medium, and that such a function requires an internal microcontroller with enough intelligence to write the new code and restart the apparatus 10.

In one embodiment, the system 10 is capable of sensing its communication signal strength and can adjust to slower data rates to improve communication reliability. In another embodiment, system 10 provides an indicator 13, e.g. LED, to the user for determining signal strength.

In one embodiment, the system 10 provides field-upgradeable software in the case where customization is needed in order to access additional networking statistics or add new functionality. In another embodiment, system 10 provides input power which is agnostic as to its polarity.

In one embodiment, the system 10 includes an Ethernet switch that allows for 802.3 Ethernet communication bridging between regular Ethernet devices and devices on the other end of the legacy wiring 24.

Figure 11:
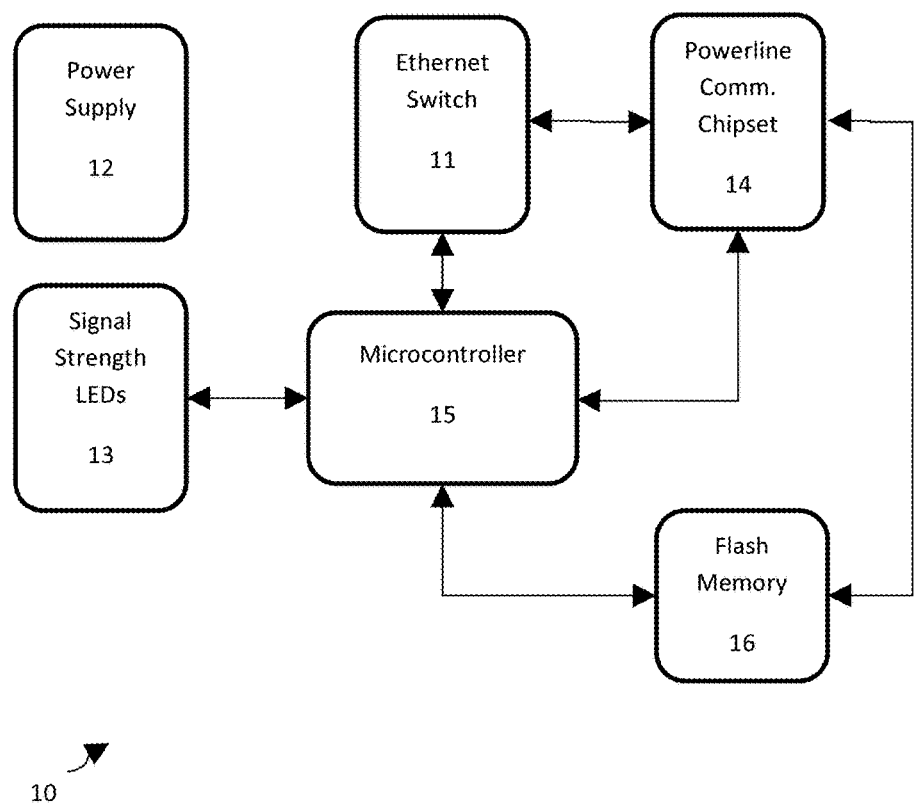
FIG. 11 is an alternative block diagram illustrating a networking system in accordance with various embodiments.

With additional reference to FIG. 11, in one embodiment, apparatus 10 includes Ethernet Switch 11, Power Supply 12, Signal Strength Indicators 13, Powerline Communication Chipset 14, e.g. HomePlug and/or the like, Microcontroller 15 and Flash Memory 16. In another embodiment, the Ethernet switch includes standardized CAT5 connection for 802.3 Ethernet communication. In another embodiment, this block has connection ports between the microcontroller 15 and the Powerline Communication Chipset 14 device in the form of a transformer-less Ethernet 802.3 communication link. Since all components reside on the same assembly, electrical isolation is not necessary.

In one embodiment, the microcontroller 15 monitors the general purpose outputs of the Powerline Communication Chipset 14, and controls its RESET. In another embodiment, the system 10 does this so that the microcontroller 15 can perform firmware upgrades to the chipset 14, as well as discover its unique address identification. In another embodiment, the microcontroller 15 also queries the Powerline Communication chipset 14 periodically over the transformer-less Ethernet 802.3 communication link to discover its data-rate for presenting the information to the user via indicator 13 LEDs.

In one embodiment, the power supply 12 provides all power rails to the rest of the system 10. In this configuration the supply input range is expanded so as to provide flexibility for power supply sources. In another embodiment, power supply input is non-polarized for ease of installation.

Figure 12:
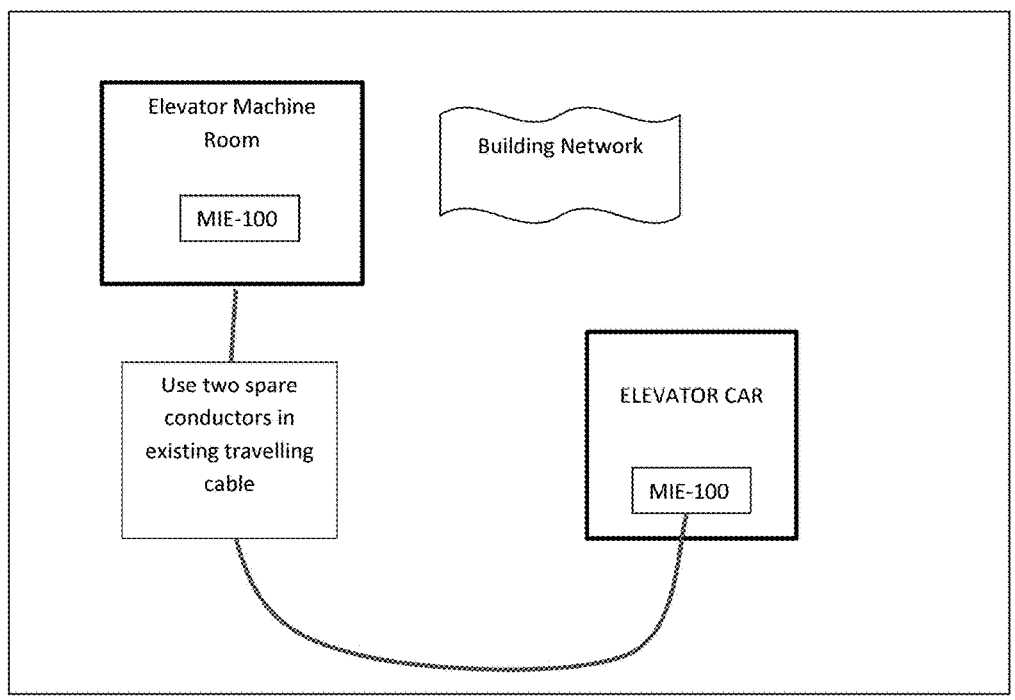
FIG. 12 is a block diagram illustrating existing wiring used for data communication between an elevator machine room and an elevator car in accordance with various embodiments of FIG. 11.

The entire apparatus 10 of FIG. 11 is hereafter referred to by the designator "MIE-100". With additional reference to FIG. 12, in one embodiment, (1) existing travel cable wiring 24 can be used for data communication between the elevator machine room and the car, in this configuration (2) regular Ethernet-based devices (e.g. in-car displays, in-car voice over IP and in-car diagnostics) can be provided through this wiring.

Figure 13:
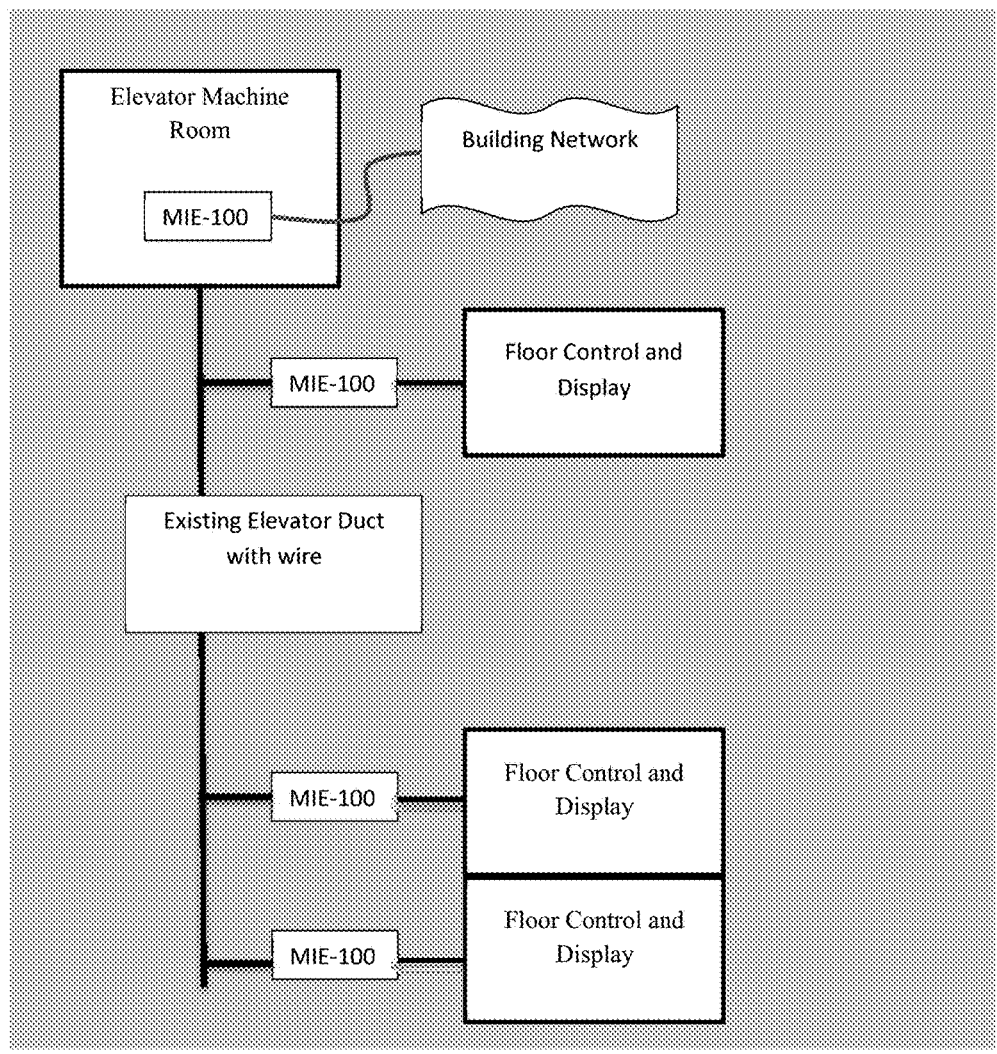
FIG. 13 is a block diagram illustrating utilization of existing wiring of the network system to add functionality in accordance with various embodiments of FIG. 11.

With additional reference to FIG. 13, the MIE-100 makes use of (1) the existing DUCT/PIPE/WIRE 24 fixtures and then enables (2) on-floor displays, security access control devices, and voice over IP (VoIP).

Figure 14:
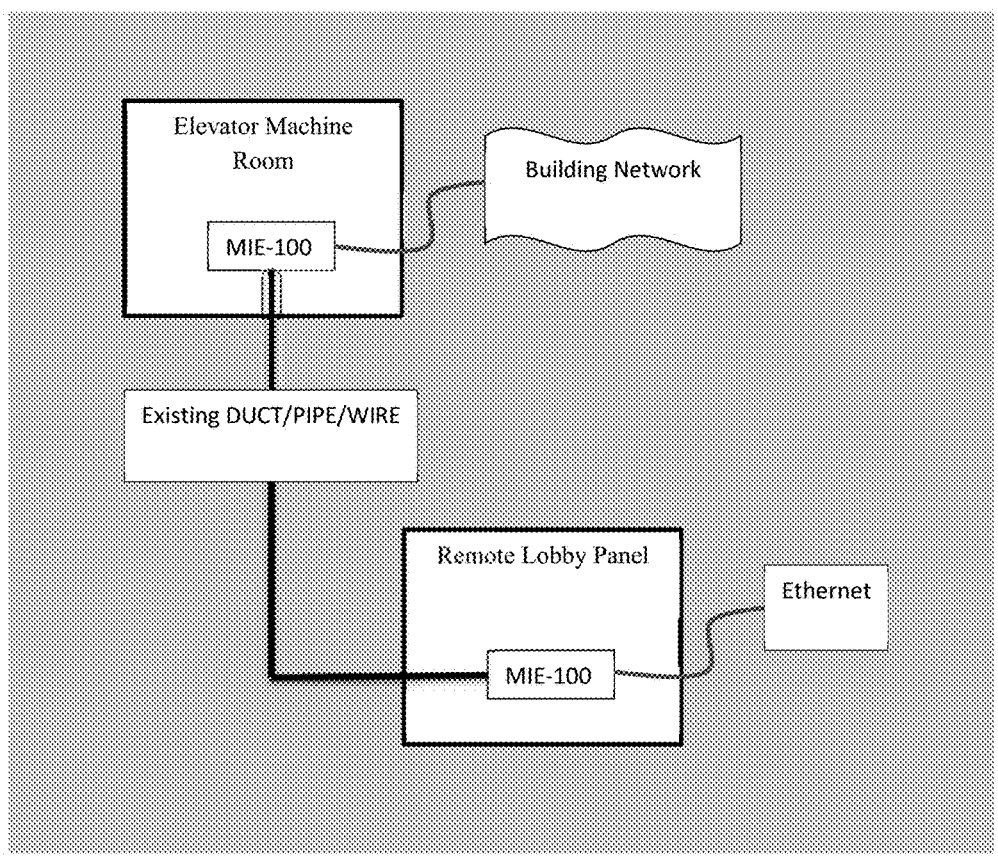
FIG. 14 is a block diagram illustrating utilization of existing wiring of the network system in accordance with various embodiments of FIG. 11.

With additional reference to FIG. 14, in this configuration, existing wiring 24 is used between the main lobby control panel and the elevator machine room. In another embodiment, the MIE-100 makes use of button, LED or switch wires and runs 802.3 traffic over these wires without running new CAT5 or CAT6 wiring.

Figure 15:
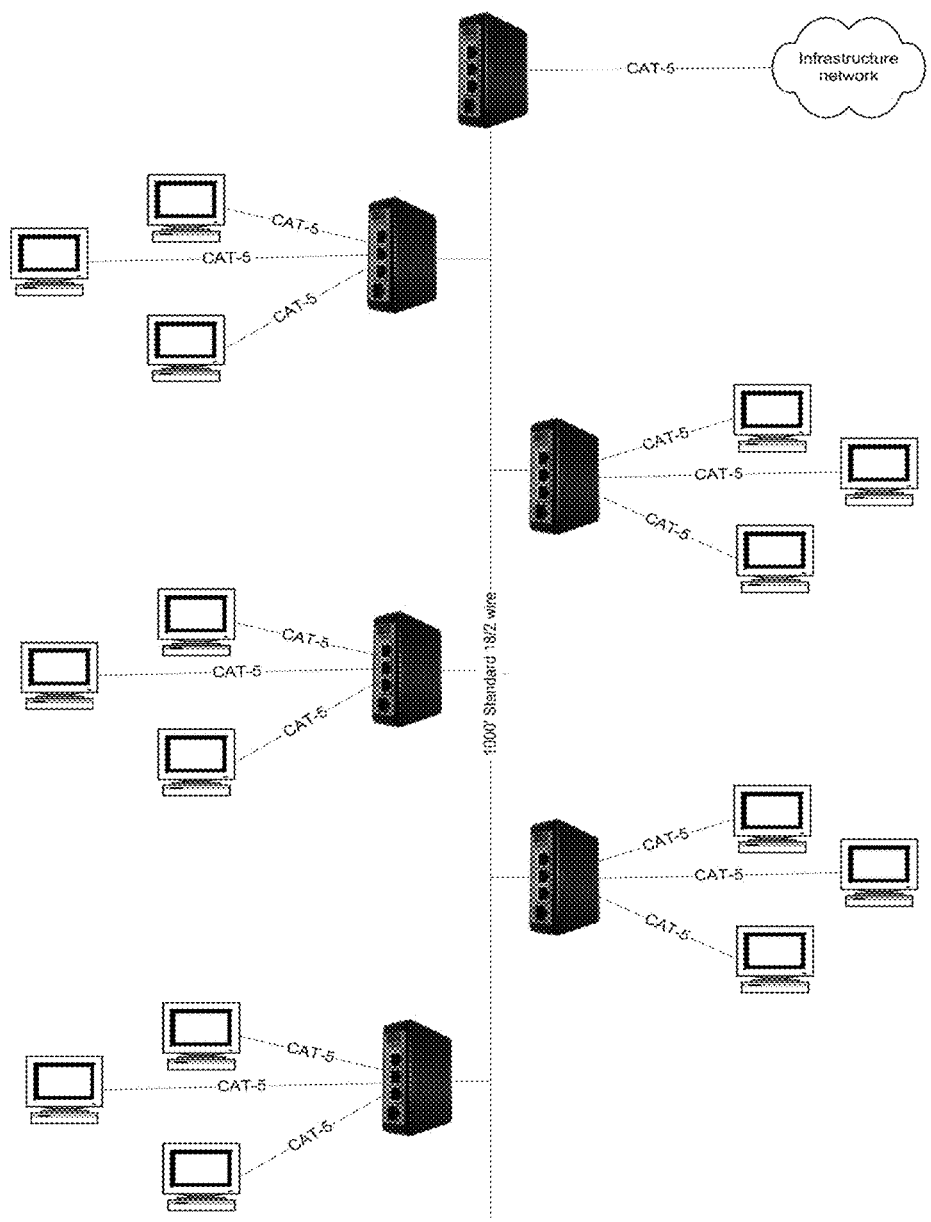
FIG. 15 is a block diagram illustrating topologies of the network system in accordance with various embodiments of FIG. 11.

With additional reference to FIG. 15, this figure shows a much larger non-standard environment to illustrate the flexibility of the system 10 with respect to network topology. In one embodiment, the 1000 foot standard 18 gauge wire again represents existing legacy elevator wiring 24, possibly in a duct or pipe. The multiple MIE-100 devices each with local CAT5 802.3 Ethernet networks show the extensibility of the system 10 to more local network segments.

In one embodiment, an elevator networking system comprising at least two of a) elevator call panel, b) elevator car interior control, c) elevator machine room, or d) connection to at least one other PC, laptop, or wired or wireless Ethernet compatible device, where the network provides for communication among all devices, e.g. elevator network components, using a software protocol, with additional functionality for elevator control. In another embodiment, the software protocol uses TCP/IP standards.

In one embodiment, system 10 includes where the communication network reuses legacy communications wiring 24 at the elevator facility. In another embodiment, system 10 can be used to add Ethernet on elevator or hoistway for applications independent of the elevator control system—including but not limited to; audio or video displays, voice communication to the car such as voice-over-IP (VoIP), and security/access control systems.

In one embodiment, system 10 includes where the communication protocol automatically adapts the data rate to the quality of wiring infrastructure 24 in a dynamic fashion. In another embodiment, system 10 includes where the legacy wiring can be of multiple physical forms, including but not limited to twisted pair CAT5 or CAT6, untwisted pair, solid conductor, stranded conductor, COAX RG-6, COAX RG-59, any gauge or combination thereof, and/or the like.

In one embodiment, system 10, while designed for improved operation over 2 legacy wires 24, will operate on either 1 or 2 legacy wires, the function of same remaining intact with 1 wire dropped and with only data rate and distance being affected. In another embodiment, system 10 operates on new wiring 24.

In one embodiment, system 10 includes where the physical network is a linear topology. In another embodiment, system 10 includes where the physical network is a star topology. In another embodiment, system 10 includes where the physical network is an arbitrary tree topology.

In one embodiment, system 10 includes where the communication network uses HomePlug Powerline Alliance communication technology. In another embodiment, system 10 includes where the communication network uses 802.3 Ethernet technologies.

In one embodiment, system 10 includes where bandwidth monitoring, latency, and other network diagnostic functionality is provided. In another embodiment, system 10 includes where communication network is used for calling elevator cars.

In one embodiment, system 10 includes where the communication network is used to provide car destination or routing information. In another embodiment, system 10 includes where elevator call panel consists of a legacy up/down button selection.

In one embodiment, system 10 includes where elevator call panel consists of a kiosk with audio and/or video output. In another embodiment, system 10 includes where elevator car control panel consists of legacy floor number selection.

In one embodiment, system 10 includes where elevator car control panel includes an audio and/or video output. In another embodiment, system 10 includes where communication network is used for VoIP communication to/from elevator cars.

In one embodiment, system 10 includes where communication network is used to deliver other audio and/or video to elevator car. In another embodiment, system 10 includes where communication network is used to deliver audio and/or video to kiosk call panel.

In one embodiment, system 10 includes where communication is to an on-board microcontroller for code updates and customization. In another embodiment, system 10 includes where the communication link adapts to the wiring in the system, and displays this data rate in the form of graduated LED indicators.

In one embodiment, system 10 includes a color-coded connector scheme to assure proper connection of power and communication connection to the apparatus. In another embodiment, system 10 includes a suite of software (SW) tools designed for the setup and maintenance of the resulting network.

In one embodiment, the SW Tools provide for the detection and identification of all devices on the network. In another embodiment, the SW Tools provide for the data rate and other characterization of devices on the network.

In one embodiment, the SW Tools provide for detection of network topology. In another embodiment, the SW Tools provide to user a visual mapping for connected devices and network topology.

In one embodiment, the SW Tools provide for remote management of devices. In another embodiment, the SW Tools provide for quantitative and visual metrics on network condition and/or performance, including bandwidth monitoring, latency detection, network resend or fault counts, or other network diagnostic information.

In one embodiment, the SW Tools will autonomously notify defined personnel when metric and/or condition triggers suggest real-time monitoring is necessary. Autonomous notification may be of forms including but not limited to: email, SMS text message, 'chat' network message, automated voice dialing, and/or the like.

In one embodiment, system 10 may be employed in other environments and industries such as where some of the plurality of nodes 22 comprise casino network components. For example, the system 10 allows communication of accounting, multi-machine jackpot, multimedia streaming, or other communication between gaming machines and each other or with back office accounting or other services. Such communication may use existing wiring 24 previously used for SAS accounting or TIA-485-A, RS485, and/or the like machine communication.

In another embodiment, system 10 operates where some of the plurality of nodes 22 comprise petroleum/convenience store components. For example, the system 10 enables communication of fuel station information, credit and debit payment authorization and processing, multimedia, error reporting, and other communication between fueling stations, internal point-of-sale (POS) units, and credit/debit processing. Such communication may use existing wires 22 previously employed for TIA-485-A, RS485, and/or the like fueling station to POS communication.

As will be appreciated by one skilled in the art, aspects may be embodied as a system, method, and/or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments are described above with reference to flowchart illustrations and/or block diagrams of methods, apparatus (systems) and computer program products according to the embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the various embodiments with various modifications as are suited to the particular use contemplated.

While the preferred embodiment has been described, it will be understood that those skilled in the art, both now and in the future, may make various improvements and enhancements which fall within the scope of the claims which follow. These claims should be construed to maintain the proper protection for the embodiments first described.

What is claimed is:
1. A system comprising:
   an interface connected to an at least one of a plurality of nodes via non-power line wiring not used for Ethernet communications; and
   a controller carrying the interface, the controller using a broadband over power line protocol to provide Ethernet data communications over the non-power line wiring amongst each of the at least one of plurality of nodes wherein the controller determines signal strength on the non-power line wiring.

2. The system of claim 1 wherein the controller adjusts data rates on the non-power line wiring based upon the signal strength determination.

3. A system comprising:
   an interface connected to an at least one of a plurality of nodes via non-power line wiring not used for Ethernet communications; and
   a controller carrying the interface, the controller using a broadband over power line protocol to provide Ethernet data communications over the non-power line wiring amongst each of the at least one of plurality of nodes wherein the controller provides input power that is agnostic as to its polarity.

4. A method comprising:
   connecting to an at least one of a plurality of nodes via non-power line wiring not used for Ethernet communications;
   using a broadband over power line protocol via a controller to provide Ethernet data communications over the non-power line wiring amongst each of the at least one of plurality of nodes; and
   determining signal strength on the non-power line wiring via the controller.

5. The method of claim 4 further comprising adjusting data rates on the non-power line wiring based upon the signal strength determination.

6. A method comprising:
   connecting to an at least one of a plurality of nodes via non-power line wiring not used for Ethernet communications;
   using a broadband over power line protocol via a controller to provide Ethernet data communications over the non-power line wiring amongst each of the at least one of plurality of nodes; and
   providing input power that is agnostic as to its polarity via the controller.

\* \* \* \* \*